United States Patent [19]

Steeve

[11] 4,433,502

[45] * Feb. 28, 1984

[54] GEOMETRIC WEEDLESS FISHHOOK ASSEMBLY

[76] Inventor: Edward J. Steeve, 7122 N. Odell, Chicago, Ill. 60631

[ * ] Notice: The portion of the term of this patent subsequent to May 24, 2000 has been disclaimed.

[21] Appl. No.: 283,504

[22] Filed: Jul. 15, 1981

Related U.S. Application Data

[63] Continuation-in-part of Ser. No. 245,101, Mar. 18, 1981.

[51] Int. Cl.³ .................. A01K 83/02; A01K 85/00
[52] U.S. Cl. .................. 43/43.2; 43/42.24; 43/44.82
[58] Field of Search ............. 43/42.4, 42.41, 42.1, 43/43.4, 43.2, 34, 36, 37, 35, 89, 42, 42.24, 44.82

[56] References Cited

U.S. PATENT DOCUMENTS

| | | | |
|---|---|---|---|
| 454,580 | 6/1891 | Mack | 43/43.2 |
| 647,076 | 4/1900 | Carpenter | 43/35 |
| 699,711 | 5/1902 | Pyott | 43/42.28 |
| 1,056,397 | 3/1913 | Bonnell | 43/36 |
| 1,262,039 | 4/1918 | Graves | 43/35 |
| 2,124,263 | 7/1938 | Schott | 43/43.2 |
| 2,332,400 | 10/1943 | Richardson | 43/42.1 |
| 2,556,702 | 6/1951 | Nielsen | 43/42.1 X |
| 2,971,285 | 2/1961 | Murawski | 43/35 |
| 3,727,340 | 4/1973 | Harris | 43/43.2 |
| 4,283,877 | 8/1981 | Onstott et al. | 43/34 |

Primary Examiner—Nicholas P. Godici
Assistant Examiner—Charles L. Willis
Attorney, Agent, or Firm—Emrich, Lee, Brown & Hill

[57] ABSTRACT

A fishhook assembly has the characteristics of being weedless in its unactivated-rest-position by nature of the symmetrical configuration of the three or four identical fishhooks, each point of which is positioned to the outside of the assembly and guarded by an adjacent fishhook. Resilience may be provided by the hook shanks or by other resilient members. The resilient members may be covered by a thin sheet of material, converting the assembly into a lure. Alternatively, the assembly may be used as an attachment to a lure. Additional weedless protection may be provided by protrusions or offsets on the shanks.

26 Claims, 20 Drawing Figures

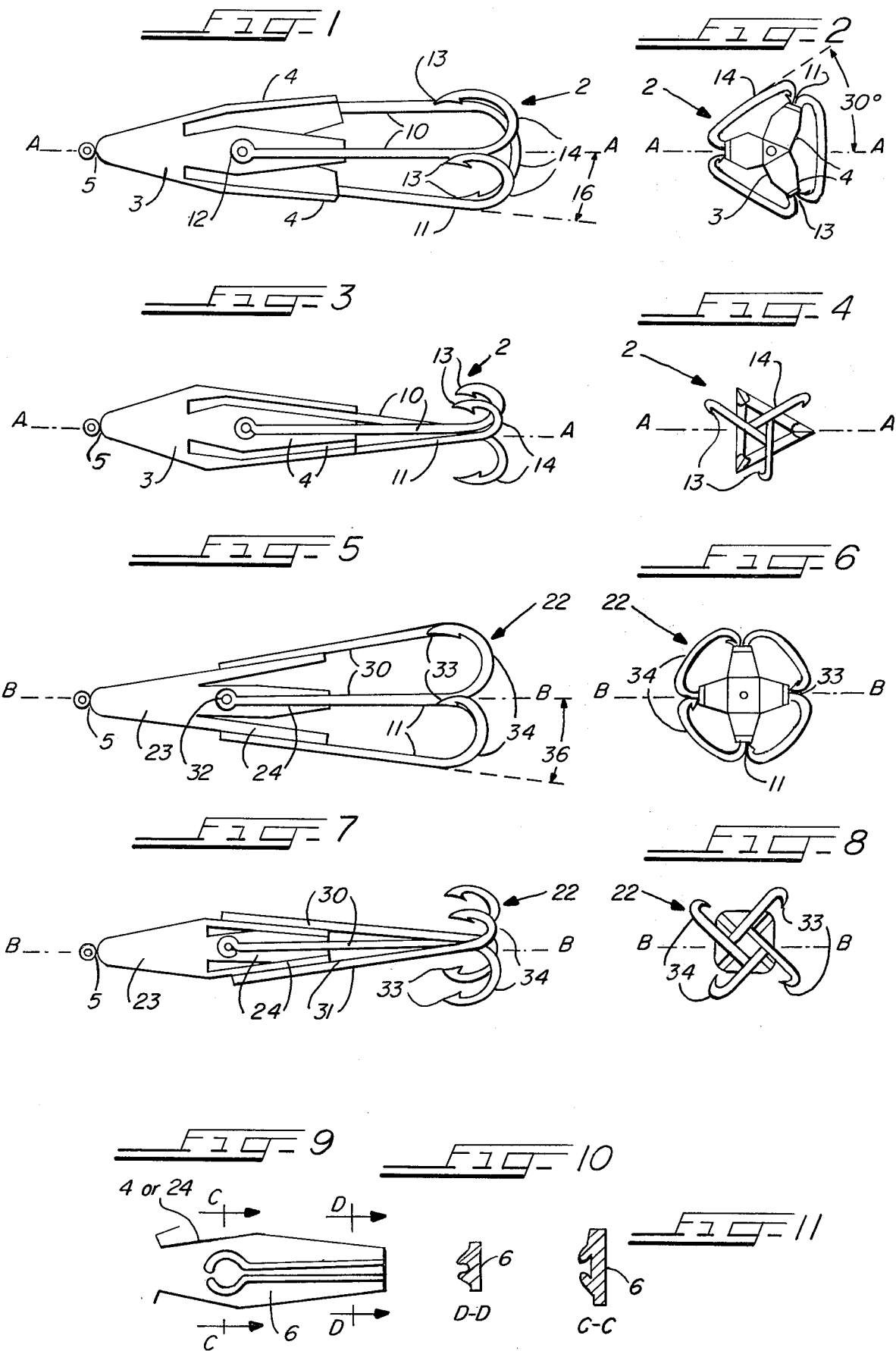

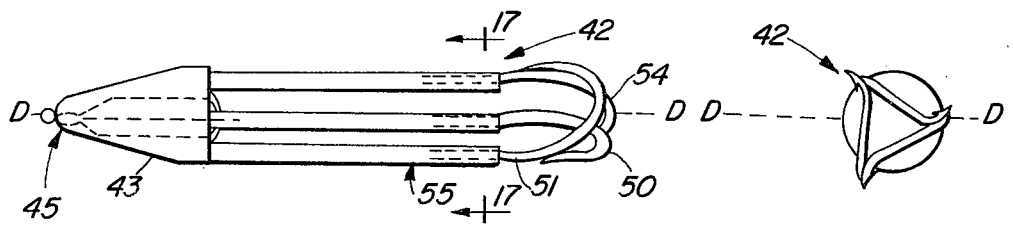
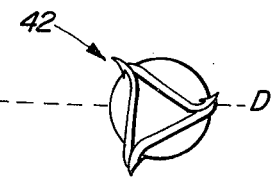
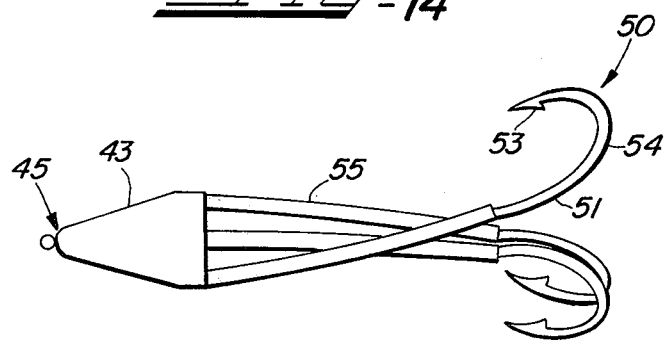
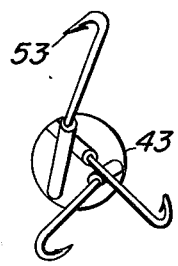
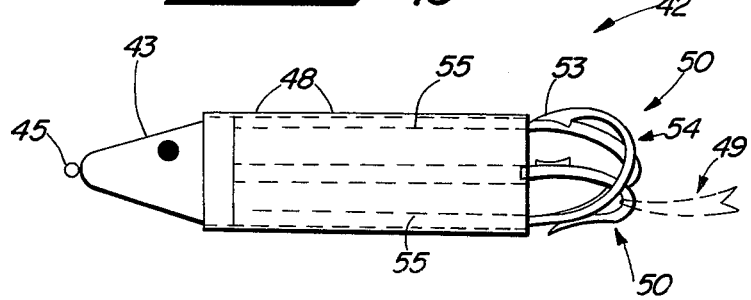
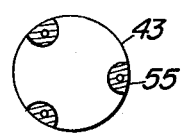
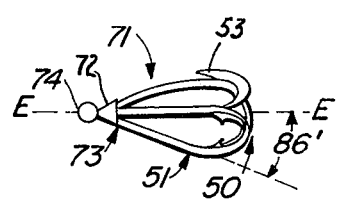
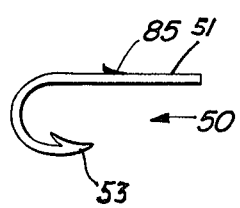
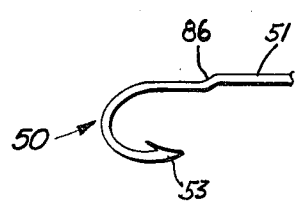

GEOMETRIC WEEDLESS FISHHOOK ASSEMBLY

This application is a continuation-in-part application of application Ser. No. 06-245-101, filed Mar. 18, 1981, by the inventor and still pending.

BACKGROUND OF THE INVENTION

The present invention relates to a multiple gang-type fishhook, the configuration of which has the characteristics of being weedless, having a minimum cross-sectional area in the direction of retrieve, and a minimum length for presentation of all fishhooks.

It is a well known fact that fish seek the protection of cover such as weeds, brush, or sunken trees, and that fishing in, or close to these protective areas produces better catches than fishing in open areas. However, fishing with conventional fishhooks results in snagging the weeds or brush. When using conventional weedless type fishhooks the weed protective devices cause the fish to miss being snagged in the mouth by the point of the fishhook. For example, in the case of a single weedless fishhook made weedless by a protective wire or wires positioned above the point, the wire itself is a physical obstacle to the mechanics of snagging the fish, and the plane of the fishhook must be in the near vertical position relative to the open-and-close motion of the fish's mouth.

This disadvantage can be somewhat overcome by the use of a treble fishhook having each of its points protected by wires extending above the points. However, the cross-sectional area of a treble fishhook with protective wires is large and the wires still act as an obstacle to the snagging action.

Fishhook assemblies made weedless by nature of their geometry present an opportunity for improvement and a number of designs have been presented in the past. However, in each of the previous inventions there are shortcomings which have prevented the wide acceptance of the use. For example, in the case of a multiple fishhook assembly having its weedless characteristics by nature of two fishhooks being positioned in the same plane, but facing in opposite directions so their respective points are protected, the fish must close its mouth at a near right angle to the plane of the fishhook assembly to become snagged. This disadvantage is somewhat overcome by positioning a second shorter pair of fishhooks at right angles to the first pair. Examples of these configuration are given in U.S. Pat. Nos. 2,124,263 and 3,727,340. However, the second direction of movement is added at the expense of a second pair of fishhooks which are of a different size than the first pair. Furthermore, the second pair of fishhooks are hidden behind the first pair, adding length to the fishhook assembly and decreasing the effectiveness of snagging a fish.

An example of a weedless multiple fishhook assembly where the fishhooks are not paired, but randomly placed, is illustrated by U.S. Pat. No. 3,331,151. In this weedless fishhook assembly the point of each fishhook is placed in a general inward position to gain its weedless characteristics. The assembly has the disadvantages of requiring each fishhook to be a different size, and requiring hand assembly to avoid interference with each moving fishhook. Also, the different lengths of each fishhook adds to the overall length of the assembly.

SUMMARY OF THE INVENTION

It is one object of the present invention to provide a multiple fishhook assembly comprised of at least three fishhooks.

It is another object of the present invention to provide a multiple fishhook assembly having weedless properties by nature of a closely nested configuration, whereby each fishhook provides the weedless protection for an adjacent fishhook.

It is a further object of the present invention to provide a weedless multiple fishhook assembly which in the activated-open-snagging-position presents at least one exposed point of a fishhook to the fish's mouth no matter what axial or longitudinal position the fish strikes the fishhook assembly.

It is another object of the present invention to provide a weedless multiple fishhook assembly which has a minimum over-all length and minimum cross-sectional area in its unactivated closed-at-rest-position, and to present a larger cross-sectional area in its activated-open-snagging-position with the points of the fishhooks exposed within the fish's mouth.

It is still another object of the invention to provide a treble fishhook assembly having weedless properties in its unactivated-closed-rest-position due to its closed triangular, square or rectangular configuration, and excellent fish snagging properties in its activated-open-position due to its enlarged open configuration which exposes the fishhook points.

It is still an additional object of the present invention to provide a weedless multiple fishhook assembly having an appearance of a baitfish by nature of a thin flexible rubber-like material which covers a portion of the fishhook assembly forward of the fishhook points.

It is still a further object of the present invention to provide a weedless multiple fishhook assembly which can be attached to various fishing lures, thus rendering them weedless.

It is still one further object of the present invention to provide a multiple weedless fishhook assembly which when dressed with a reflective coating, spinners, feathers, or hair has the appearance of a swimming minnow.

BRIEF DESCRIPTION OF DRAWINGS

FIG. 1 is a side view of the treble fishhook assembly using leaf springs in its unactivated-closed-rest-position.

FIG. 2 is an end view of FIG. 1 observing the same from right to left.

FIG. 3 is a side view of the treble fishhook assembly of FIG. 1 in its fully activated-open-snagging-position.

FIG. 4 is an end view of FIG. 3 observing the same from right to left.

FIG. 5 is a side view of the quadruple fishhook assembly in its unactivated-closed-rest-position.

FIG. 6 is an end view of FIG. 5 observing the same from right to left.

FIG. 7 is a side view of the quadruple fishhook assembly of FIG. 5 in its fully activated-open-snagging position.

FIG. 8 is an end view of FIG. 7 observing the same from right to left.

FIG. 9 is a detail of FIG. 1 or FIG. 5 illustrating one method of fabricating a housing for securely fastening a fishhook within the leaf-spring portion of the mounting stem.

FIG. 10 is an end view of FIG. 9 in section taken on section line D—D.

FIG. 11 is an end view of FIG. 9 in section taken on section line C—C.

FIG. 12 is a side view of a treble fishhook assembly utilizing flexible shank extensions in its unactivated-closed-rest-position.

FIG. 13 is an end view of FIG. 12 observing the same from right to left.

FIG. 14 is a side view of the treble fishhook assembly of FIG. 12 shown in one of its activated-open-snagging-positions.

FIG. 15 is an end view of FIG. 14 observing the same from right to left.

FIG. 16 is a side view of the fishhook assembly of FIG. 12 having a thin flexible tube covering a portion of the assembly.

FIG. 17 is an end view of FIG. 12 in section taken on section line E—E.

FIG. 18 is a side view of a further embodiment of the weedless treble fishhook assembly having a minimum overall length for attachment to fishing lures such as spoons, spinners and plugs which normally use unprotected treble hooks.

FIG. 19 is a side view of a fishhook with a protrusion added to its shank which provides added weedless protection to adjacent fishhook point, and FIG. 20 is a side view of a fishhook offset in its shank portion which provides added weedless protection to an adjacent fishhook point.

DETAILED DESCRIPTION OF THE DRAWINGS

In referring now to the drawings, for purposes of description, McLane's Standard Fishing Encyclopedia, Fifth printing, published by Holt, Rinehart and Winston, pages 397-408 are included as reference. Like reference numerals have been used for each embodiment to identify the same or similar parts.

Treble Fishhook Embodiment

In one mode of the present invention illustrated by FIGS. 1-4, the weedless fishhook assembly 2 uses three nearly identical fishhooks 10, each fastened to one of the three arms 4 of a mounting stem 3. The mounting stem 3 is fabricated of a flexible plastic, or of a metal having spring-like properties, and having three arms 4, acting as leaf springs, symmetrically positioned around the central longitudinal axis A—A, and extending at a small acute angle 16 to the axis A—A, in the unactivated-closed-rest-position, as illustrated by FIGS. 1 and 2. The arms 4 are formed so that simultaneous movement of the arms 4 toward the axis A—A is unrestricted to the activated-open-snagging-position, as illustrated by FIGS. 3 and 4. A fishing line attaching member 5 having an eye, and a shank which extends into the forward body of the mounting stem 3 along the axis A—A is securely attached thereto. The three fishhooks 10 are firmly secured, one each to the flexible arms 4 of the mounting stem 3. For example, in FIGS. 9-11 when the mounting stem 3 is molded of plastic, a housing 6 may be molded as part of the arms 4. It should also be noted that the mounting stem 3 must be fabricated for a specific size and shape of the fishhooks 10.

When the mounting stem 3 and arms 4 are fabricated of metal, the shank 11 of the fishhook 10 can be welded or soldered to the arm 4. It is also possible with fishhooks 10, having shanks 11 with flexible properties, to eliminate the arms 4 by securing the shanks 11 to the mounting stem 3 also having the shanks 11 act as the leaf springs.

There are many acceptable methods for the secure fastening of the fishhooks 10 to the mounting stem 3. However, an important concept of the assembly is the positioning of the fishhooks 10, their bends 14, and points 13 in relation to each other and to the axis A—A.

The fishhook shanks 11 are symmetrically positioned around the axis A—A and extend from the arms 4 at a small acute angle 16 to the axis A—A. It is also within the scope of the invention to fabricate the mounting stem 3 such that the fishhook shanks 11 extend from the arms 4 parallel to the axis A—A.

Each of the fishhook points 13 is placed so it is nested close to, and preferably touching, an adjacent fishhook shank 11 with only one point 13 positioned at each shank 11.

When positioning the fishhooks 10, it is especially significant that the point 13 is nested in a position to the outside of the fishhook assembly 2 in order that the fishhooks 10 not interfere with each other when their shanks 11 are moved toward the axis A—A and the activated-snagging-position. For the treble fishhook assembly 2, the plane formed by the shank 11 and bend portion 14 of each of the three fishhooks 10 is at an approximate 30° angle with the plane formed by axis A—A and the shank 11 of the fishhook 10. When the treble fishhook assembly 2 is in its rest-position and has the configuration as described above and illustrated in FIG. 1 and FIG. 2, the shanks 11 of the three fishhooks 10 are free to move toward the axis A—A, and the activated-open-position. This exposes the three points 13 for snagging the fish, as illustrated in FIG. 3 and FIG. 4, because the bend portions 14 and points 13 create a larger cross-sectional area of snagging exposure, where the fishhooks 10 are, in effect, forced into the mouth of the fish as it closes and the fishing line is reeled in.

It should be noted that because of the symmetrical geometry of the treble fishhook assembly 2, that at least one fishhook point 13, but more probable, two points 13, will be exposed in the activated-position as a result of any up-down closing of the fish's mouth. It is, however, not necessary that all three points 13 be exposed in the closing action to snag the fish. It is within the scope of the present invention that the shanks 11 may be mounted on the inside of arms 4 of housing 6 and that the eye portion 12 (FIG. 1) of 32 (FIG. 5) may be eliminated such that section C—C (FIG. 11) will retain the shanks to the arms.

Quadruple Fishhook Embodiment

In a second mode of the present invention, illustrated by FIGS. 5-8, the weedless fishhook assembly 22 uses four nearly identical fishhooks 30, one each fastened to each one of the four arms 24 of a mounting stem 23.

It should be noted at this point that most of the description of the construction and operation of the treble fishhook assembly 2 is very similar to that for the weedless fishhook assembly using four fishhooks 22. This is because the same principle of invention is used in each.

The mounting stem 23 is fabricated of a flexible plastic, or of a metal having spring-like properties, and having four arms 24 symmetrically positioned around the central longitudinal axis B—B, and extending at a small acute angle 36 in the unactivated-closed-rest-position with the axis B—B, illustrated by FIG. 5 and FIG. 6. The arms 24 are formed so simultaneous movement of all four arms 24 toward the axis B—B is unrestricted to the activated-open-snagging-position illustrated by FIG. 7 and FIG. 8. A fishing line attaching member 5, having an eye and a shank which extends into the forward body of the mounting stem 23 along the axis B—B, is securely attached thereto. The four fishhooks 30 are secured, one each, to the flexible arms 24 of the mounting stem 23. For example, in FIGS. 9-11 when the mounting stem 23 is molded of plastic, housing 6 for the secure fitting and cementing of the fishhook shank 31 may be molded as part of the arms 24. It should be noted also that the mounting stem 23 may be fabricated for a specific size and shape of fishhook 30.

When the mounting stem 23 and arms 24 are fabricated of metal, the shank 31 of the fishhook 30 can be welded or soldered to the arm 24. It is also possible with fishhooks 30 having shanks 31 with flexible properties, to eliminate the arms 24 by securing the shanks 31 to the mounting stem 23 and having the shanks 31 act as the leaf springs.

There are many acceptable methods for the secure fastening of the fishhooks 30 to the mounting stem 23. However, an important concept of the assembly is the exact positioning of the fishhooks 30, their bend portions 34 and points 33 in relation to each other and to the axis B—B.

The fishhook shanks 31 are symmetrically positioned around the axis B—B and extend from the arms 34 at a small acute angle 36 to the axis B—B. It is also within the scope of the present invention to fabricate the mounting stem 23 such that the fishhook shanks 31 extend from the arms 24 parallel to the axis B—B. Each of the points 33 is placed so it is nested close to, and preferably touching, an adjacent fishhook shank 31 with only one point 33 positioned at each shank 31, as will hereinafter be described. When positioning the fishhooks 30, it is important that the point 33 be nested in a position to the outside of the fishhook assembly 22 in order to avoid interference with the other fishhooks 30 when the shanks 31 are moved toward the axis B—B and the activated-open-snagging-position. For the quadruple fishhook assembly 22, the planes are formed by the shank 31 and bend portions 34 of each of the four fishhooks 30 is at an approximate 45° angle with the plane formed by axis B—B and the shank 31 of the fishhook 30.

When the quadruple fishhook assembly 22 is in its unactivated-closed-rest-position and has the configuration, as described above and illustrated in FIGS. 5 and 6, the shanks 31 of the four fishhooks 30 are free to move toward the axis B—B and the activated-open-position, thus exposing the four points 33 for snagging the fish, a position as illustrated in FIGS. 7 and 8, because the bend portions 34 and points 33 create a larger cross-sectional area of snagging exposure and the fishhooks 30 are, in effect forced into the mouth of the fish as it closes and the fishing line reeled in.

It should be noted that because of the symmetrical geometry of the quadruple fishhook assembly 22, that at least two of the four fishhook points 33 will be exposed in the activated-position as a result of any up-down closing of the fish's mouth. Accordingly, it is not necessary that all four points 33 be exposed in the closing action to snag the fish.

Unrestricted Multiple Fishhook Assembly

Another embodiment of the present invention is illustrated by FIGS. 12-15, wherein the weedless fishhook assembly 42 is comprised of three substantially identical fishhooks 50. The fishhook assembly 42 utilizes the principle of protecting the fishhook points 53 from snagging weeds or brush, as the fishhook assembly 2 shown in FIG. 1. One difference between these two embodiments is that the fishhook assembly 42 is much less restrictive in the direction of movement of the fishhook shanks 51 away from the unactivated-closed-rest-position to the activated-open-snagging-position.

Also, the mounting stem 43 includes an opening extending therethrough and centered on the central longitudinal axis D—D for installing a fishing line attaching member 45 having an eye and a shank held by a quick release nut. This opening is enlarged at the rear portion of the mounting stem 43 to permit the option of either adding weight to make the fishhook assembly 42 heavier, or making the assembly 42 lighter by the addition of a buoyant material, such as cork or a closed cell plastic.

The fishhook shanks 51 are cemented or molded into the inside of flexible plastic shank extensions 55 which are molded as part of the mounting stem 43, or as separate extensions 55 securely embedded in the mounting stem 43. The mounting stem 43 may be molded of and composed of plastic or rubber or it may be fabricated of metal. The shape of the shank extensions 55, shown in section in FIG. 12 have their outer surface coinciding with that of the outer diameter of the mounting stem 43. This shape has the advantage of providing a relatively flat surface to which colored or reflective materials may be cemented; however, other shapes, such as round are also acceptable.

Referring now to FIG. 12, the fishhook shanks 51 and their extensions 55 are symmetrically positioned around the central longitudinal axis D—D and extend from the rear portion of the mounting stem 43, either at a small acute angle to the longitudinal axis D—D, or as shown in FIGS. 12-16 parallel to the longitudinal axis D—D. These shank extensions 55 also serve as a resilient means to permit movement of the fishhook points 53 to an activated-open-snagging-position when the jaws of the fish close around the fishhook assembly 42 as illustrated by FIGS. 14 and 15. The resilient means of the shank extensions 55 may be a flexible plastic material, or flexible plastic tubes and be in the form of leaf springs.

Additionally, the fishhook assembly 42 includes positioning of three identical fishhooks 50, each of the points 53 positioned so that it is nested close to, and preferably touching an adjacent fishhook shank 51. It is important that the points 53 are nested in a position to the outside of the fishhook assembly 42 in order that the fishhooks 50 not interfere with each other when moving to the activated-open-snagging-position.

In FIGS. 12-16 and FIG. 18, a fishhook 50 is used which has an offset point 53. The type is well known to those in the art as an Eagle Claw design. When three such fishhooks 50 are positioned, as in FIG. 12, with the offset in the bends 54 leaning in toward the central longitudinal axis D—D, the cross-sectional area of the fishhook assembly 42 in the unactivated-closed-rest-position at the bends 54 appears smaller than a similar cross-section of a fishhook 50 having a straight point 13, as shown in FIG. 1.

It is important to note that the activated-open-snagging-position of the fishhook assembly 42, shown in FIGS. 13 and 15, is just one of many possible resulting configurations each of which depends on how the fish closes its mouth on the fishhook shanks 51 or extensions 55.

In the embodiment which uses three identical fishhooks 50, the fishhook assembly 42 has the appearance of an equilateral triangle at the bends 54 when viewed from the rear, which is illustrated by FIG. 2 and FIG. 13. However, many other configurations are possible by choosing fishhooks which have different sized bends, gaps and points, In general, the fishhook shanks should be about the same length so the fishhook points can be nested close to an adjacent fishhook shank. Where three fishhooks are used in a weedless fishhook assembly, but where only two of the three fishhooks are identical the assembly will have the appearance of an isosceles triangle when viewed from the rear. When four identical fishhooks are used, the assembly takes on the appearance of a square, as shown in FIG. 6. However, by using two different size fishhooks, two fishhooks per size, the appearance will be that of a rectangle.

FIG. 16 illustrates an enhancement of the fishhook assembly 42 shown in FIGS. 12-15 where this modified weedless fishhook assembly 42 takes on the appearance of a small fish. This is accomplished by covering the fishhook assembly 42 with a thin flexible sheet material 48 in the form of a tube or skirt. The tube 48 is placed forward of the position occupied by the fishhook points 53 and secured to the rear portion of the mounting stem 43 either by its own elasticity or by a supplemental elastic band. The flexible sheet material 48, such as rubber or plastic, can be imprinted in various colors and designs to resemble the various type of baitfish and be interchangeable. This permits a single fishhook assembly 42 to be used in a range of colors and patterns by merely interchanging the flexible covering 48. The flexible covering 48 does not restrict the movement of the shank extensions 55, and because the covering 48 is placed forward of the fishhook points 53, it does not interfere with their movement and the snagging operation. As a further addition to the fishhook assembly 42, shown in FIG. 16, a thin flexible strip 49, imitating a fish's tail action can be added to one or more of the fishhook bends 54, as it can be to any of the other fishhook assembly modes.

One special configuration of the weedless fishhook assembly 71 which has a shorter overall length than the fishhook assemblies of FIG. 1 and FIG. 2 is shown in FIG. 18. It has a special application of being a substitute for treble ganged fishhooks which are attached to crank baits, plugs, spoons, spinners or even artificial worms to make these lures weedless. The three identical fishhooks 50 are assembled with their points 53 nested close to adjacent fishhook shanks 51, similar to that of the other fishhook assemblies shown in FIGS. 1 and 12. The fishhook shanks 51 are symmetrically placed around the central longitudinal axis E—E and are terminated at a resilient means 73 of a type as described previously in this specification, and which forms part of the mounting stem 72. FIG. 18 shows the acute angle 86' larger than that illustrated by the assemblies of FIG. 1 or FIG. 12. This is because of the shorter overall length of the assembly of FIG. 18. An alternative to this construction is to broaden the diameter of the mounting stem 72 and reduce the acute angle 86 and thus gain more movement from the fishhook points 53 for a given movement of the fishhook shanks 51.

It should be noted that the foregoing descriptions of the construction of the weedless fishhook assembly are not the only methods which are possible. Other combinations of materials and resilient means are also suitable depending on the purpose of the fishhook assembly, the flexibility desired in the movement of the fishhook points from the unactivated-closed-rest-position to the activated-open-snagging-position, and the preference of the manufacturer. For example, in FIG. 12, the shank extensions 55 may be eliminated and the fishhook shanks 51 directly secured to the flexible plastic material forming part of the mounting stem 43 or the fishhook shanks 51 may be securely fastened to other types of resilient means such as various types of coil springs. Also, the fishhook shanks 51 themselves may be fabricated so they are resilient and be fastened to a rigid mounting stem. The fishhook assembly 42 is also readily adapted to be dressed with feathers, hair, or reflective materials cemented to the mounting stem 43 and shank extensions 55 which can all be preceded by various types of spinners.

FIG. 19 and FIG. 20 illustrate two methods of enhancing the weedless and snagging properties of the fishhook assembly. In FIG. 19, a slight protrusion 85 is added to the shank portion 51 of fishhook 50 to give extra guarding protection to the fishhook point which will be nested immediately behind it. In FIG. 20, the added protection is obtained by an offset 86 in the shank 51 of the fishhook 50.

I claim:
1. A weedless treble fishhook assembly, comprising:
 a. a mounting stem having a forward and rear portion,
 b. fastening means securely fastened to said mounting stem for the attachment of a fishing line,
 c. three fishhooks of substantially the same length, each having a point, a bend portion and a shank, the shanks of each said fishhooks symmetrically placed, equidistant from each other and securely fastened to said mounting stem, and each of said shanks, while in an unactivated-closed-rest-position extending at a first acute angle to a common longitudinal axis which passes through the center of the forward and rear portions of said mounting stem, and each said shank forming a first plane with its respective bend and a second plane with the common longitudinal axis whereby a second acute angle formed between the first plane and second plane in such a manner that the point of each said fishhook is closely nested to an adjacent said fishhook with only one point nested behind each adjacent said fishhook and the points of said fishhooks are located on the outside of said fishhook assembly; and
 d. resilient means cooperating between each of said fishhooks and said mounting stem for moving the shanks of said fishhooks from the unactivated-closed-rest-position in a direction to coincide with the common longitudinal axis, tending to reduce said first acute angle between the shanks of said fishhooks and the common longitudinal axis to zero degrees, thereby moving the points of said fishhooks away from the nested position to an exposed position for snagging fish.

2. A weedless multiple fishhook assembly as recited in claim 1 wherein said mounting stem is molded of plastic.

3. The fishhook assembly as recited in claim 1 wherein said mounting stem is molded of rubber.

4. The fishhook assembly as recited in claim 1 wherein said mounting stem is fabricated of metal.

5. The fishhook assembly as recited in claim 1 wherein said resilient means are said shanks of said fishhooks.

6. The fishhook assembly as recited in claim 1 wherein said resilient means is a part of said rear portion of said mounting stem and having the form of three identical leaf springs symmetrically positioned for the secure fastening of said shanks of said fishhooks.

7. The weedless fishhook assembly as recited in claim 6 wherein said mounting stem includes a housing portion adapted to secure said shank of said fishhook onto said leaf spring portion of said mounting stem.

8. A weedless multiple fishhook assembly, comprising:
   a. a mounting stem having a forward and rear portion,
   b. fastening means securely fastened to said mounting stem for the attachment of a fishing line,
   c. four fishhooks of substantially the same length, each having a point, a bend portion and a shank portion, the shanks of each said fishhooks symmetrically placed, equidistant from each other and securely fastened to said mounting stem, and each of the shanks, while in an unactivated-closed-rest-position extending at a first acute angle to a common longitudinal axis which passes through the center of said forward and rear portions of said mounting stem, and each shank forming a first plane with its respective bend and a second plane with the common longitudinal axis whereby a second acute angle is formed between the first plane and second plane in such a manner that the point of each said fishhook is closely nested adjacent said fishhook with only one point nested behind each adjacent said fishhook and the points of said fishhooks are located on the outside of said fishhook assembly, and
   d. resilient means cooperating between each of said fishhooks and said mounting stem for moving said shanks of said fishhooks from the unactivated-closed-rest-position in a direction to coincide with the common longitudinal axis, tending to reduce said first acute angles between the shanks of said fishhooks and the common longitudinal axis to zero degrees, thereby moving said points of said fishhooks away from the nested position to an exposed position for snagging fish.

9. The fishhook assembly as recited in claim 8 wherein said mounting stem is molded of plastic.

10. The fishhook assembly as recited in claim 8 wherein said mounting stem is molded of rubber.

11. The fishhook assembly as recited in claim 8 wherein said mounting stem is fabricated of metal.

12. The fishhook assembly as recited in claim 8 wherein said resilient means are said shanks of said fishhooks.

13. The fishhook assembly as recited in claim 8 wherein said resilient means is a part of said rear portion of said mounting stem and having the form of the three identical leaf springs symmetrically positioned for the secure fastening of said shanks of said fishhooks.

14. The fishhook assembly as recited as in claim 13 wherein said mounting stem includes a housing portion adapted to secure said shank of said fishhook onto said leaf spring portions of said mounting stem.

15. A weedless fishhook assembly comprising:
   a. a mounting stem having a forward and rear portion,
   b. fastening means securely fastened to said mounting stem for the attachment of a fishing line,
   c. three fishhooks, each having a point, a bend and a shank portion, with said three fishhooks symmetrically positioned around the central longitudinal axis of the fishhook assembly whereby in an unactivated-rest-position, said shank portion of each of said fishhooks extend from said rear portion of said mounting stem at an acute angle to a central longitudinal axis of the fishhook assembly which also passes through the centerline of the forward and rear portions of said mounting stem, and where said point of each of said fishhooks is closely nested to an adjacent fishhook in such a manner that each said adjacent fishhook has only one point of a said fishhook nested close to it, and the points of said fishhooks are located on the outside of said fishhook assembly, and
   d. resilient means cooperating between each of said fishhooks and said mounting stem for moving said point of each said fishhook away from the closely-nested, unactivated-rest-position to an activated-open-position whereby the points of said fishhooks are exposed for snagging fish.

16. The weedless fishhook assembly recited in claim 15 wherein said three fishhooks are positioned around the central longitudinal axis and wherein at least two of said fishhooks are identical in length.

17. The weedless fishhook assembly in accordance with claim 15 further including an additional fishhook having a point, a bend and a shank portion, with each of said fishhooks being positioned around said central longitudinal axis and extending from said rear portion of said mounting stem.

18. The weedless fishhook assembly in accordance with claim 17 wherein each of said fishhooks are identical in length and symmetrically positioned around said central longitudinal axis.

19. The fishhook assembly as recited in claim 15 wherein said resilient means is a flexible plastic material.

20. The fishhook assembly as recited in claim 15 wherein said resilient means are flexible plastic tubes.

21. The fishhook assembly as recited in claim 15 wherein said resilient means are the shanks of said fishhooks.

22. The fishhook assembly as recited in claim 15 wherein said resilient means are leaf springs.

23. The fishhook assembly as recited in claim 15 wherein said acute angles between the shanks of said fishhooks and the central longitudinal axis of said fishhook assembly are reduced to zero whereby the shanks of said fishhooks are parallel to said central longitudinal axis of the fishhook assembly.

24. The fishhook assembly as recited in claim 15 wherein said shank of each said fishhook has a slight protrusion located immediately forward of the position occupied by the point of said adjacent fishhook to provide protection from snagging during usage.

25. The fishhook assembly as recited in claim 15 wherein said shanks of each said fishhook has an offset immediately forward of the portion occupied by the point of a said adjacent fishhook to provide protection from snagging during usage.

26. The weedless fishhook assembly as recited in claim 15 further comprising:
   e. a flexible thin sheet material covering at least a portion of said fishhook assembly forward of the portion occupied by the points of said adjacent fishhooks, whereby the points of said fishhooks are free to move to the activated-open-position.

* * * * *